UNITED STATES PATENT OFFICE.

FREDERICK GEORGE FRYER AND BASIL GORDON McLELLAN, OF YORK, ENGLAND.

MANUFACTURE OF HIGH-CLASS "FONDANT" CHOCOLATE AND SIMILAR CHOCOLATES.

1,387,378. Specification of Letters Patent. Patented Aug. 9, 1921.

No Drawing. Application filed July 27, 1920. Serial No. 399,344.

*To all whom it may concern:*

Be it known that we, FREDERICK GEORGE FRYER and BASIL GORDON MCLELLAN, subjects of the King of the United Kingdom of Great Britain and Ireland, residing at York, England, have invented certain new and useful Improvements in the Manufacture of High-Class "Fondant" Chocolate and Similar Chocolates, of which the following is a specification.

This invention relates to the manufacture of high class "fondant" chocolate and similar chocolates of a smooth consistency. One of the most important features of these chocolates is the extreme fineness to which their constituents are ultimately ground.

Hitherto the desired ultimate degree of fineness of the constituents of the final product has in all cases (with the exception of the process according to the invention claimed in our pending patent application No. 399,377) been attained by grinding to the required degree the partially ground constituents after they have been mixed or incorporated in the desired proportions. Thus in a system of manufacturing high class "fondant" chocolate commonly adopted the essential ingredients, namely, the cocoa liquor and the powdered sugar are mixed together or incorporated while the sugar and the solid particles of the cocoa liquor are in a state which is coarse compared with their condition in the finished product. After the cocoa liquor and the sugar in this comparatively coarse condition, with or without other ingredients such as flavoring materials and cocoa butter, have been mixed together, the mixture is passed as many times as is deemed necessary through grinding machines, such as refiners or broyeuses, for example, so that the solid particles may be pulverized or comminuted into a finer and finer state of subdivision until they attain the degree of fineness required for the final product. After the mixture has been treated the desired number of times in the grinding machines it is subjected to a further lengthy treatment in conches or in other suitable machines whereby the aroma of the chocolate is developed and other important changes are effected by the application of heat or by agitation or by agitation accompanied by heating.

In the above described system the grinding of the mixed ingredients necessitates the use of very expensive grinding machines which involve the consumption of much labor, power, time and floor space. With a view to reducing the disadvantages of employing these heavy grinding machines conical or disk mills or the like have in some cases been employed for grinding the mixed ingredients.

Now, the present invention consists in very materially reducing the grinding operation or repeated grinding operations to which the mixture comprising cocoa liquor and sugar with or without other ingredients is subjected and in not mixing said ingredients together before the sugar and the solid particles of the cocoa liquor are very much finer than when in the coarse condition in which they have hitherto been mixed together in the system commonly adopted hitherto. The other ingredients, if requiring to be ground, are preferably also very much finer than when in the condition in which they have hitherto been added.

In processes according to the present invention the mixture is always passed at least once through a grinding machine at some convenient period.

In order to produce cocoa liquor having solid particles of the desired degree of fineness the cocoa nibs may be ground in any suitable manner, for instance, they may be passed through a nib grinding mill of any suitable kind and then once through an ordinary grinding machine having several pairs of rollers so set as to give the required fineness. The amount of grinding machinery required in this operation is not materially greater than that required in the usual operation of producing the cocoa liquor prior to the usual mixing operation, the grinding of the solid particles contained in the liquor to a further degree of fineness being effected very readily with accurately adjusted machinery.

The desired degree of fineness of the solid particles of the cocoa liquor is such that the following test may be complied with, namely, that at least 90% and preferably 95% will pass through a standard sieve having 240 meshes to one inch and made of woven wire, silk or other material of a thickness very nearly equal to the intervening spaces. The holes of such a sieve are consequently very closely 53/1000 of a millimeter square. The test is to be carried out during the removal of fat from the cocoa liquor in the following manner:—

To a glass tube about 1¾" diameter and 5" long and having one end slightly opened out, is attached the sieve material of the grade specified. A weighed quantity of about 2 grams of the cocoa mass or liquor is introduced into the weighed tube, so that it rests on the sieve material. The tube is then dipped into a beaker containing distilled petroleum ether and gently agitated so as to cause the petroleum ether to pass upward and downward through the sieve. The cocoa is thus deprived of its fatty content, and the finer particles of the defatted cocoa pass through the sieve, the coarser ones remaining on it. Toward the completion of the defatting process which is visibly evident, the tube is transferred to a second beaker containing petroleum ether, and the operation continued till no more cocoa particles are found to be passing through the sieve. The petrol remaining on the tube and its contents is removed by heating in a steam oven, and the residual cocoa material is weighed. As cocoa mass contains upward of 50% of its weight of cocoa butter which has been almost entirely removed during the test, this has been allowed for in the figures stipulated by multiplying the residual weight by two before calculating it as a percentage of the original material.

Sugar of the desired degree of fineness may be conveniently produced in the well known type of pulverizing plant in which the fine product is obtained by a grinding and wind-sifting operation. The fine sugar required may however be prepared in any suitable manner. The desired degree of fineness of the sugar is such that the following test may be complied with, namely, that at least 90% and preferably 95% will pass through a standard sieve of 240 meshes to one inch and of the same specification as is used for cocoa. During the test the precaution is to be taken to keep the sugar dry and gentle pressure may be applied to the sugar with a smooth rounded instrument to break up any lightly cohering aggregates.

The grinding of the flavoring material when necessary or any other ingredient may be effected in any manner suitable to its consistency.

The mixing of the aforesaid fine ingredients with or without the flavorings and with or without the extra cocoa butter alluded to above may be effected in any suitable manner, for example, an ordinary chocolate mixer or melangeur may be used. The material may then be passed through a grinding machine, for example, a roller grinding machine, in which the grinding effected, even when a maximum, is very small compared with that in the usual process. In view of the very limited amount of grinding required it is possible to adjust the grinding machinery much more accurately than would otherwise be the case. After the material is such that the various particles are of the degree of fineness desired in the final product, the material may then be subjected to the usual lengthy treatment in conches or other suitable machines with the object of developing the aroma of the chocolate and effecting other important changes by comparatively gentle agitation or by such agitation accompanied by heating. Instead of said lengthy treatment in a conche or other slow-acting machine the conched or "fondant" effect may be attained after liquefying the material by subjecting it to extreme agitation or threshing for a short time. The liquefying of the material may be effected either by subjecting it for a few minutes to a high speed liquefying operation or by treating it in a melangeur or other slow-running machine for a comparatively long period, for instance, two to three hours. Said high speed liquefying operation may be effected in a beater of any suitable form, such as, for example, a cream beater. After it has been liquefied the material is subjected to the most extreme agitation or threshing for a few minutes, a regulated current of air preferably being admitted or having access to the material during treatment by any suitable means.

The ingredients are preferably in any case treated by a continuous method and not by a cumbersome batch process which in the mode of manufacture hitherto generally adopted has been necessitated by the repeated grinding operations and the treatment in the conche.

After this stage the chocolate may be directly molded or used for covering or other confectionery purposes.

The desired degrees of fineness of the solid particles of the cocoa liquor and of the sugar in the final product are those specified in our patent application No. 399,377 filed herewith.

What we claim is—

1. In the manufacture of high class fondant chocolate and similar chocolates the solid particles of the cocoa and sugar in which are of such a degree of fineness that at least 98% of each will pass through a standard sieve having 240 meshes to one inch having holes approximately 53/1000 of a millimeter square and that 100% of the sugar will pass through a standard sieve having 200 meshes to one inch having holes approximately 68/1000 of a millimeter square, the steps which consist in separately grinding the different ingredients to be mixed to a fineness such that 90% of the solid particles will pass through a standard sieve having 240 meshes to one inch, then mixing the ingredients and subsequently passing the mixture through a grinding machine.

2. Process according to claim 1 in which the mixture is subjected to a high speed liquefaction operation and an operation producing the "fondant" effect.

3. Process according to claim 2 in which the high speed liquefaction operation is performed in a beater.

4. Process according to claim 2 in which the mixture after being liquefied is subjected to extreme agitation for a comparatively short time.

5. Process according to claim 4, in which a current of air is admitted to the mixture while being agitated.

In testimony whereof, we affix our signatures in the presence of two witnesses.

FREDERICK GEORGE FRYER.
BASIL GORDON McLELLAN.

Witnesses:
ARNOLD S. NAMBEE,
OSCAR F. RUMTREE.